United States Patent
Lin et al.

(10) Patent No.: US 11,977,318 B2
(45) Date of Patent: May 7, 2024

(54) PORTABLE ELECTRONIC DEVICE AND MOVABLE LENS SHUTTING MODULE THEREOF

(71) Applicant: AZUREWAVE TECHNOLOGIES, INC., New Taipei (TW)

(72) Inventors: Kung-An Lin, New Taipei (TW); Chien-Che Ting, New Taipei (TW)

(73) Assignee: AZUREWAVE TECHNOLOGIES, INC., New Taipei (TW)

( * ) Notice: Subject to any disclaimer, the term of this patent is extended or adjusted under 35 U.S.C. 154(b) by 539 days.

(21) Appl. No.: 17/381,669

(22) Filed: Jul. 21, 2021

(65) Prior Publication Data
US 2022/0236626 A1 Jul. 28, 2022

(30) Foreign Application Priority Data
Jan. 25, 2021 (TW) .................................. 110102689

(51) Int. Cl.
*G03B 11/04* (2021.01)
*G06F 1/16* (2006.01)
*H01F 7/20* (2006.01)

(52) U.S. Cl.
CPC ............ *G03B 11/04* (2013.01); *G06F 1/1686* (2013.01); *H01F 7/20* (2013.01)

(58) Field of Classification Search
CPC ..... G03B 11/06; G03B 11/046; G03B 11/045; G03B 11/043; G03B 11/041; G03B 11/04
See application file for complete search history.

(56) References Cited

U.S. PATENT DOCUMENTS

| 7,874,745 B2 | 1/2011 | Matsumoto |
| 2005/0174009 A1* | 8/2005 | Kayama ................. H04N 23/75 |
| | | 348/E5.04 |

(Continued)

FOREIGN PATENT DOCUMENTS

| CN | 111522120 A | 8/2020 |
| JP | 2003330059 A | 11/2003 |

(Continued)

*Primary Examiner* — Christopher Stanford
*Assistant Examiner* — Journey F Sumlar
(74) *Attorney, Agent, or Firm* — Li & Cai Intellectual Property (USA) Office

(57) ABSTRACT

A portable electronic device and a movable lens-shutting module thereof are provided. The lens-shutting module includes a first magnetic assembly, a second magnetic assembly and a movable shielding assembly. The first magnetic assembly includes a fixed magnetic field generator and a movable magnetic structure including a matching portion. The second magnetic assembly includes a fixed magnetic structure, a flexible structure and a movable magnetic field generator including a limiting portion. The movable shielding assembly includes a lens shielding portion corresponding to a lens module, a matching opening matching with the matching portion, and a limiting opening corresponding to the limiting portion. Therefore, the movable magnetic structure is movable horizontally between a first and a second horizontal position relative to the fixed magnetic field generator, and the movable magnetic field generator is movable vertically between a first and a second vertical position relative to the fixed magnetic structure.

10 Claims, 12 Drawing Sheets

(56) References Cited

U.S. PATENT DOCUMENTS

| | | | |
|---|---|---|---|
| 2020/0249415 A1* | 8/2020 | Wang | G03B 5/00 |
| 2021/0349374 A1* | 11/2021 | Hung | G06F 1/1686 |
| 2022/0091358 A1 | 3/2022 | Wang et al. | |

FOREIGN PATENT DOCUMENTS

| | | | |
|---|---|---|---|
| JP | 2009251080 A | 10/2009 | |
| JP | 5399691 B2 | 1/2014 | |
| JP | 2020134751 A | 8/2020 | |
| KR | 1020070005945 A | 1/2007 | |
| KR | 1020120124876 A | 11/2012 | |

* cited by examiner

PORTABLE ELECTRONIC DEVICE AND MOVABLE LENS SHUTTING MODULE THEREOF

CROSS-REFERENCE TO RELATED PATENT APPLICATION

This application claims the benefit of priority to Taiwan Patent Application No. 110102689, filed on Jan. 25, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an electronic device and a lens shutting (lens-shutting) module thereof, and more particularly to a portable electronic device and a movable lens shutting module thereof.

BACKGROUND OF THE DISCLOSURE

In the related art, a camera lens that is equipped on a laptop computer is constantly exposed and cannot be blocked (or be shielded), so that user privacy can easily be violated when the laptop computer is used for an extended period of time.

SUMMARY OF THE DISCLOSURE

In response to the above-referenced technical inadequacy, the present disclosure provides a portable electronic device and a movable lens shutting module thereof.

In one aspect, the present disclosure provides a movable lens shutting module that includes a first magnetic assembly, a second magnetic assembly and a movable shutter assembly. The first magnetic assembly includes a fixed magnetic field generator and a movable magnetic structure adjacent to the fixed magnetic field generator, and the movable magnetic structure includes a matching portion that protrudes outwards. The second magnetic assembly includes a movable magnetic field generator, a fixed magnetic structure adjacent to the movable magnetic field generator, and an elastic structure connected to the movable magnetic field generator, and the movable magnetic field generator includes a limiting portion that protrudes outwards. The movable shutter assembly includes a lens shutting portion corresponding to a lens module, a matching opening matching with the matching portion of the movable magnetic structure, and a limiting opening corresponding to the limiting portion of the movable magnetic field generator.

More particularly, the movable magnetic structure is movable horizontally between a first horizontal position and a second horizontal position relative to the fixed magnetic field generator by cooperation of the movable magnetic structure and the fixed magnetic field generator. The movable magnetic field generator is movable vertically between a first vertical position and a second vertical position relative to the fixed magnetic structure by cooperation of the fixed magnetic structure, the movable magnetic field generator and the elastic structure. When the movable magnetic structure is horizontally moved relative to the fixed magnetic field generator from the first horizontal position to the second horizontal position, the movable magnetic field generator is placed at the first vertical position by an elastic force provided by the elastic structure, so that a side portion of the movable shutter assembly is blocked by the limiting portion of the movable magnetic field generator so as to prevent the movable shutter assembly from being moved, and the movable shutter assembly is moved to a lens shielding position by the movable magnetic structure so as to shield the lens module by the lens shutting portion of the movable shutter assembly. When the movable magnetic structure is horizontally moved relative to the fixed magnetic field generator from the second horizontal position to the first horizontal position, the movable magnetic field generator is placed at the first vertical position by the elastic force provided by the elastic structure, so that the limiting portion of the movable magnetic field generator is moved into the limiting opening of the movable shutter assembly so as to prevent the movable shutter assembly from being moved, and the movable shutter assembly is moved to a lens opening position by the movable magnetic structure so as to expose the lens module from the lens shutting portion of the movable shutter assembly. When the movable magnetic field generator is vertically and downwardly moved relative to the fixed magnetic structure from the first vertical position to the second vertical position, the movable shutter assembly is released from the limiting portion of the movable magnetic field generator, so that the movable shutter assembly is movable between the first horizontal position and the second horizontal position relative to the fixed magnetic field generator.

In another aspect, the present disclosure provides a movable lens shutting module including a first magnetic assembly, a second magnetic assembly and a movable shutter assembly. The first magnetic assembly includes a fixed magnetic field generator and a movable magnetic structure adjacent to the fixed magnetic field generator, and the movable magnetic structure includes a matching portion. The second magnetic assembly includes a movable magnetic field generator, a fixed magnetic structure adjacent to the movable magnetic field generator, and an elastic structure connected to the movable magnetic field generator, and the movable magnetic field generator includes a limiting portion. The movable shutter assembly includes a lens shutting portion corresponding to a lens module, a matching opening matching with the matching portion of the movable magnetic structure, and a limiting opening corresponding to the limiting portion of the movable magnetic field generator.

In yet another aspect, the present disclosure provides a portable electronic device using an image-capturing assembly that includes a lens module and a movable lens shutting module cooperating with the lens module, and the movable lens shutting module includes a first magnetic assembly, a second magnetic assembly and a movable shutter assembly. The first magnetic assembly includes a fixed magnetic field generator and a movable magnetic structure adjacent to the fixed magnetic field generator, and the movable magnetic structure includes a matching portion. The second magnetic assembly includes a movable magnetic field generator, a fixed magnetic structure adjacent to the movable magnetic field generator, and an elastic structure connected to the movable magnetic field generator, and the movable magnetic field generator includes a limiting portion. The movable shutter assembly includes a lens shutting portion corresponding to the lens module, a matching opening matching with the matching portion of the movable magnetic structure, and a limiting opening corresponding to the limiting portion of the movable magnetic field generator.

Therefore, by virtue of "the first magnetic assembly including a fixed magnetic field generator and a movable magnetic structure adjacent to the fixed magnetic field generator, and the movable magnetic structure including a matching portion", "the second magnetic assembly including a movable magnetic field generator, a fixed magnetic structure adjacent to the movable magnetic field generator, and an elastic structure connected to the movable magnetic field generator, and the movable magnetic field generator including a limiting portion", and "the movable shutter assembly including a lens shutting portion corresponding to a lens module, a matching opening matching with the matching portion of the movable magnetic structure, and a limiting opening corresponding to the limiting portion of the movable magnetic field generator", the movable magnetic structure is movable horizontally between a first horizontal position and a second horizontal position relative to the fixed magnetic field generator, and the movable magnetic field generator is movable vertically between a first vertical position and a second vertical position relative to the fixed magnetic structure.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
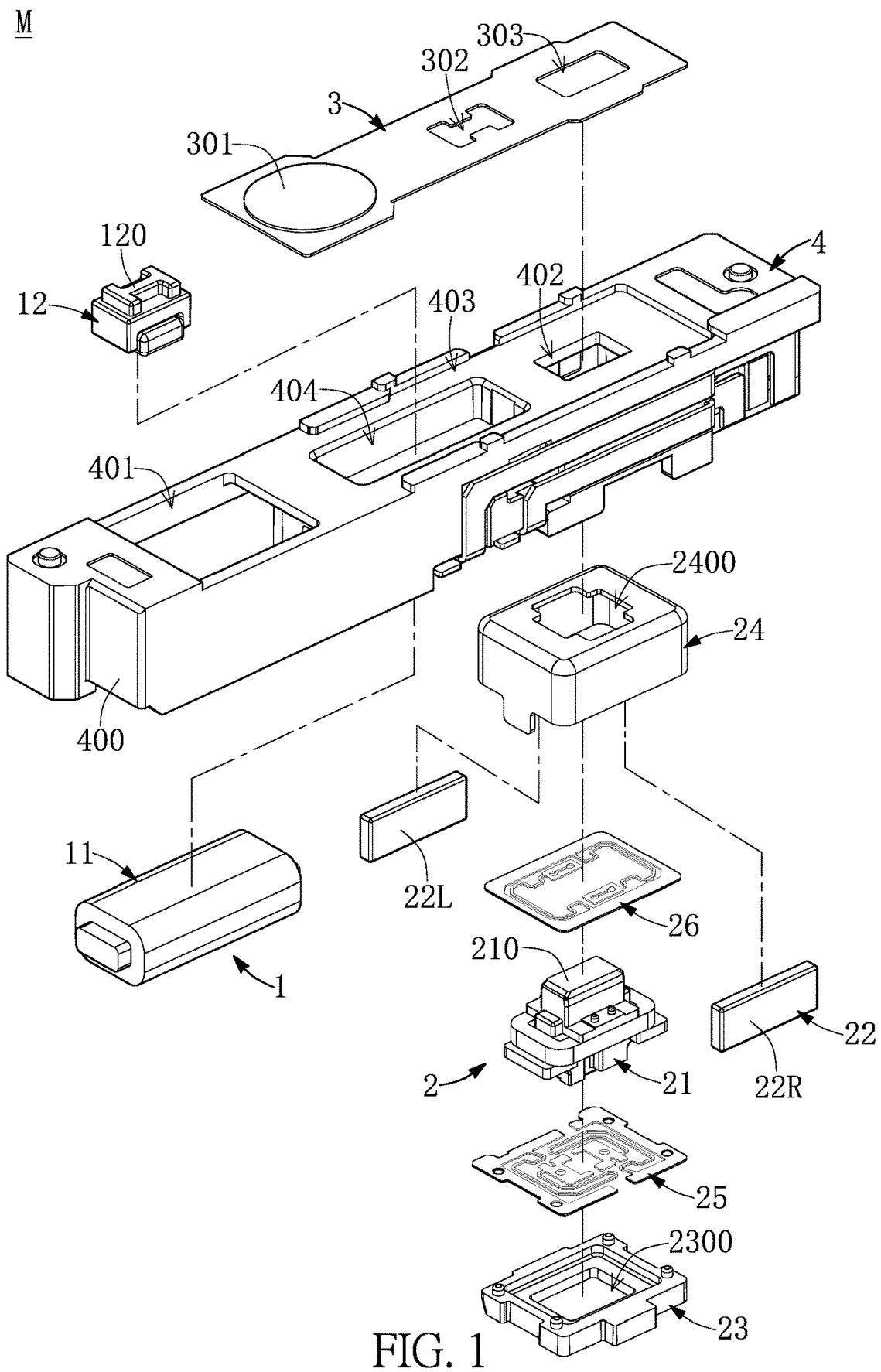
FIG. 1 is a first schematic perspective exploded view of a movable lens shutting module according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Referring to FIG. 1 to FIG. 5, a first embodiment of the present disclosure provides a movable lens shutting module M including a first magnetic assembly 1, a second magnetic assembly 2 and a movable shutter assembly 3.

Figure 4:
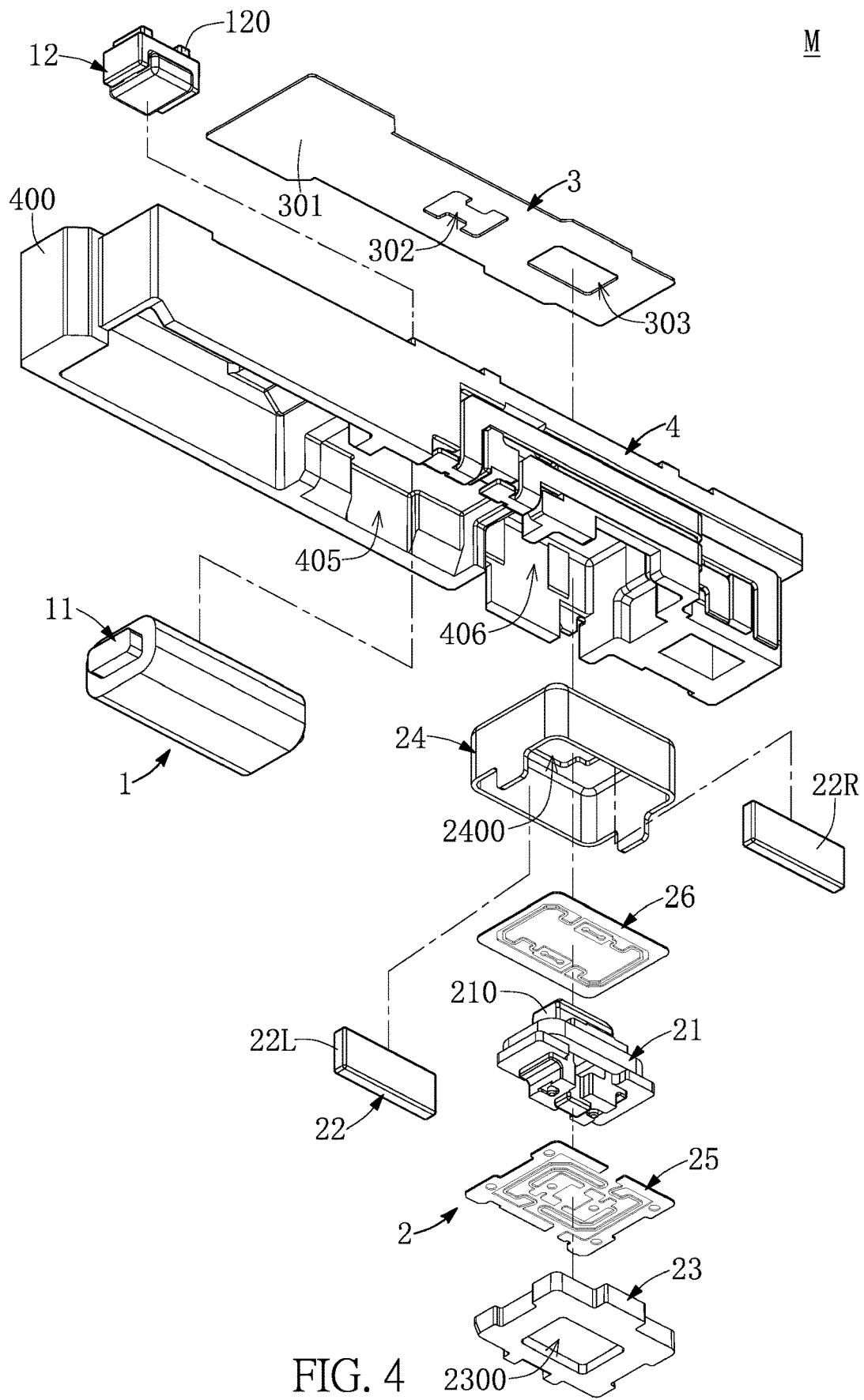
FIG. 4 is a second schematic perspective exploded view of the movable lens shutting module according to the first embodiment of the present disclosure.

More particularly, referring to FIG. 1 and FIG. 4, the first magnetic assembly 1 includes a fixed magnetic field generator 11 and a movable magnetic structure 12 (for example, the movable magnetic structure 12 is made of magnetic material, or the movable magnetic structure 12 includes a magnetic material embedded therein) adjacent to the fixed magnetic field generator 11, and the movable magnetic structure 12 includes a matching portion 120 that protrudes outwards. In addition, the second magnetic assembly 2 includes a movable magnetic field generator 21, a fixed magnetic structure 22 (for example, the fixed magnetic structure 22 is made of magnetic material, or the fixed magnetic structure 22 includes a magnetic material embedded therein) adjacent to the movable magnetic field generator 21, and an elastic structure connected to the movable magnetic field generator 21, and the movable magnetic field generator 21 includes a limiting portion 210 that protrudes outwards.

Figure 2:
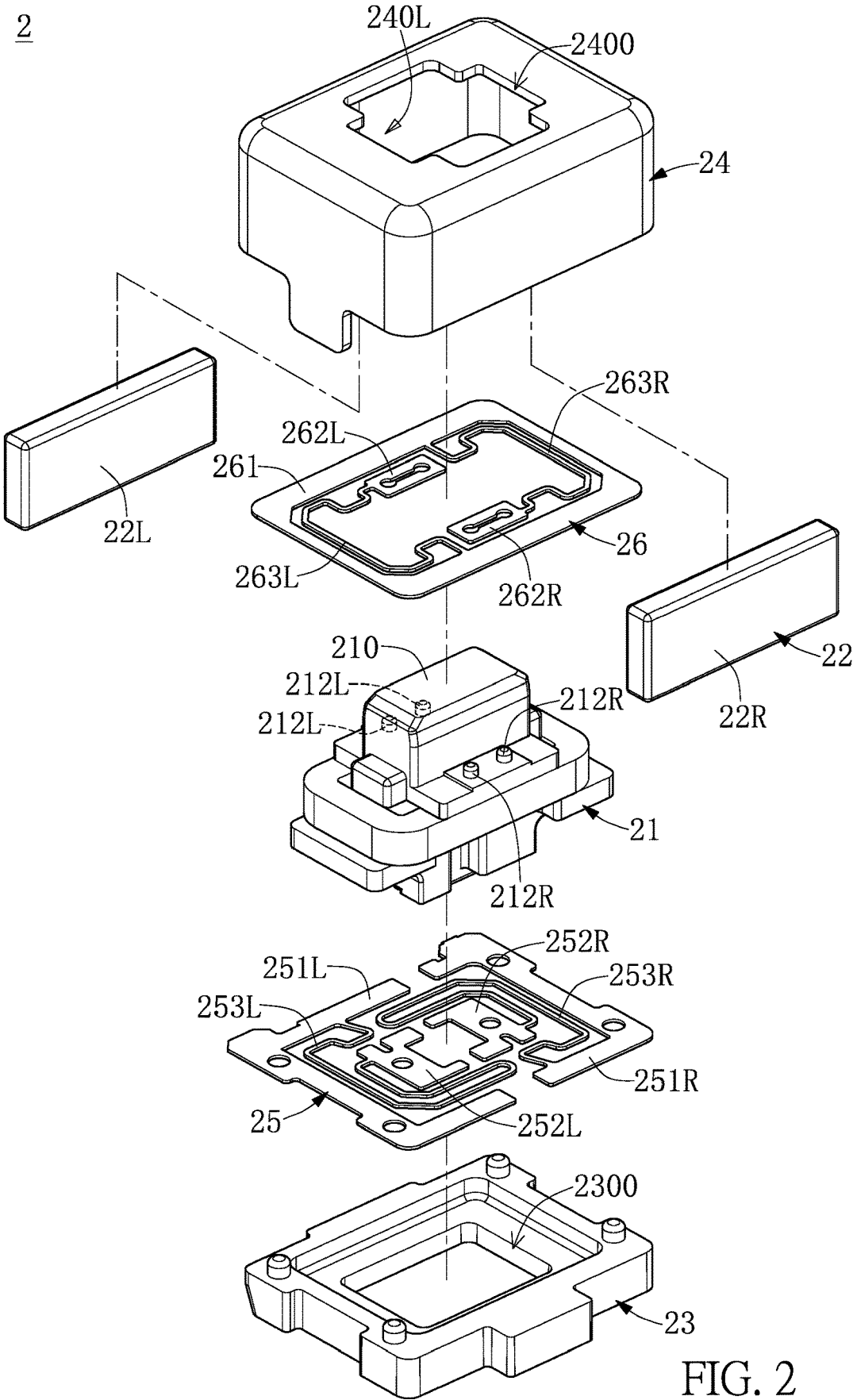
FIG. 2 is a first schematic perspective exploded view of a second magnetic assembly of the movable lens shutting module according to the first embodiment of the present disclosure.
Figure 5:
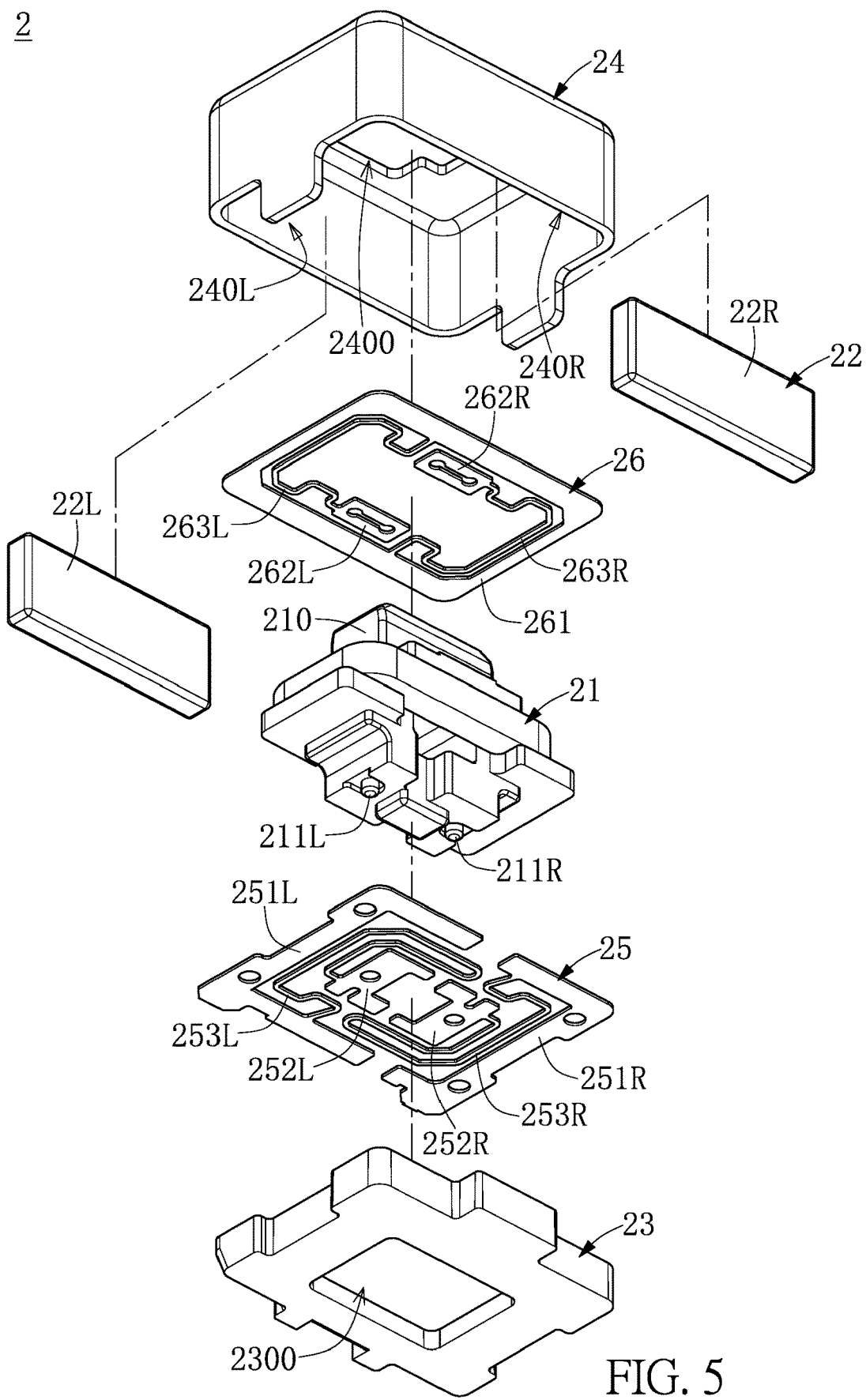
FIG. 5 is a second schematic perspective exploded view of the second magnetic assembly of the movable lens shutting module according to the first embodiment of the present disclosure.

For example, referring to FIG. 1 and FIG. 4, the second magnetic assembly 2 includes a casing structure, and the casing structure includes a bottom casing 23 and a top casing 24 matching with the bottom casing 23. Furthermore, the elastic structure includes a first elastic element 25 disposed on the bottom casing 23 and a second elastic element 26 disposed on the top casing 24, and the movable magnetic field generator 21 is disposed between the first elastic element 25 and the second elastic element 26. Moreover, the fixed magnetic structure 22 includes a left fixed magnetic element 22L disposed on a left inner wall 240L (as shown in FIG. 2 and FIG. 5) of the top casing 24 and a right fixed magnetic element 22R disposed on a right inner wall 240R (as shown in FIG. 5) of the top casing 24. In addition, the bottom casing 23 has a bottom casing opening 2300 for exposing the first elastic element 25, and the top casing 24 has a top casing opening 2400 for exposing the limiting portion 210 of the movable magnetic field generator 21. However, the aforementioned description of the first embodiment is merely an example and is not meant to limit the scope of the present disclosure.

For example, referring to FIG. 2 and FIG. 5, the first elastic element 25 has a first left outer matching portion 251L fixedly or detachably disposed on the bottom casing 23, a first right outer matching portion 251R fixedly or detachably disposed on the bottom casing 23, a first left inner matching portion 252L disposed on a first left matching portion 211L (such as including a matching block) of the movable magnetic field generator 21, a first right inner matching portion 252R disposed on a first right matching portion 211R (such as including a matching block) of the movable magnetic field generator 21, a first left elastic portion 253L connected between the first left outer matching portion 251L and the first left inner matching portion 252L, and a first right elastic portion 253R connected between the first right outer matching portion 251R and the first right inner matching portion 252R. Therefore, the first left inner matching portion 252L and the first right inner matching portion 252R can be moved respectively relative to the first left outer matching portion 251L and the first right outer matching portion 251R respectively through elasticity provided by the first left elastic portion 253L and the first right elastic portion 253R, so that the movable magnetic field generator 21 can be moved relative to both the first left outer matching portion 251L and the first right outer matching portion 251R simultaneously through two elastic forces that are respectively provided by the first left elastic portion 253L and the first right elastic portion 253R. However, the aforementioned description of the first embodiment is merely an example and is not meant to limit the scope of the present disclosure.

For example, referring to FIG. 2 and FIG. 5, the second elastic element 26 has an outer surrounding matching portion 261 (such as a complete circular structure or an incomplete circular structure) fixedly or detachably disposed on the top casing 24, a second left inner matching portion 262L fixedly or detachably disposed on a second left matching portion 212L (or two second left matching portions 212L) of the movable magnetic field generator 21, a second right inner matching portion 262R fixedly or detachably disposed on a second right matching portion 212R (or two second right matching portions 212R) of the movable magnetic field generator 21, a second left elastic portion 263L connected between the outer surrounding matching portion 261 and the second left inner matching portion 262L, and a second right elastic portion 263R connected between the outer surrounding matching portion 261 and the second right inner matching portion 262R. Therefore, the second left inner matching portion 262L and the second right inner matching portion 262R can be simultaneously moved relative to the outer surrounding matching portion 261 respectively through two elastic forces that are respectively provided by the second left elastic portion 263L and the second right elastic portion 263R, so that the movable magnetic field generator 21 can be moved relative to the outer surrounding matching portion 261 simultaneously through the two elastic forces that are respectively provided by the second left elastic portion 263L and the second right elastic portion 263R. However, the aforementioned description of the first embodiment is merely an example and is not meant to limit the scope of the present disclosure.

Furthermore, referring to FIG. 1 and FIG. 4, the movable shutter assembly 3 includes a lens shutting portion 301 for corresponding to a lens module L (as shown in FIG. 6 to FIG. 11), a matching opening 302 for matching with the matching portion 120 of the movable magnetic structure 12, and a limiting opening 303 for corresponding to the limiting portion 210 of the movable magnetic field generator 21.

Figure 3:
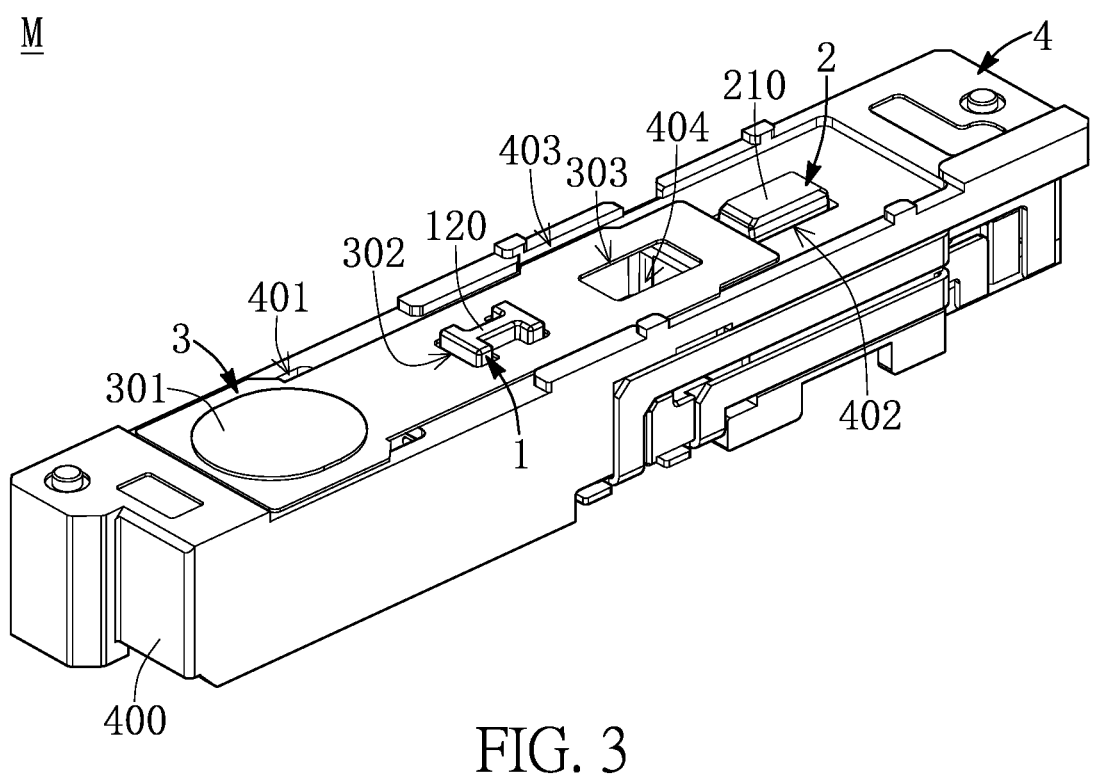
FIG. 3 is a schematic perspective assembled view of the movable lens shutting module according to the first embodiment of the present disclosure.

For example, referring to FIG. 1 and FIG. 4, the movable lens shutting module M further includes a carrying structure 4, and the carrying structure 4 includes a base body 400, a lens opening 401, a limiting portion opening 402, a first sliding groove 403, a second sliding groove 404, a first receiving groove 405 and a second receiving groove 406. More particularly, the lens opening 401 can pass through the base body 400 for exposing the lens module L and corresponds to the lens shutting portion 301 of the movable shutter assembly 3, and the limiting portion opening 402 can pass through the base body 400 for exposing the limiting portion 210 of the movable magnetic field generator 21 and corresponds to the limiting opening 303 of the movable shutter assembly 3. The first sliding groove 403 can be formed on a top side of the base body 400 (as shown in FIG. 1) for receiving the movable shutter assembly 3, and the movable shutter assembly 3 can be movably disposed inside the first sliding groove 403. The second sliding groove 404 can be formed on the top side of the base body 400 (as shown in FIG. 1) for receiving the movable magnetic structure 12 and corresponds to the matching opening 302 of the movable shutter assembly 3, and the movable magnetic structure 12 can be movably disposed inside the second sliding groove 404. Furthermore, the first receiving groove 405 can be formed on a bottom side of the base body 400 (as shown in FIG. 4) for receiving the fixed magnetic field generator 11, and the fixed magnetic field generator 11 can be fixedly disposed inside the first receiving groove 405. The second receiving groove 406 can be formed on the bottom side of the base body 400 (as shown in FIG. 4) for receiving the second magnetic assembly 2, and the casing structure of the second magnetic assembly 2 can be fixedly disposed inside the second receiving groove 406 (as shown in FIG. 3). However, the aforementioned description of the first embodiment is merely an example and is not meant to limit the scope of the present disclosure.

Figure 6:
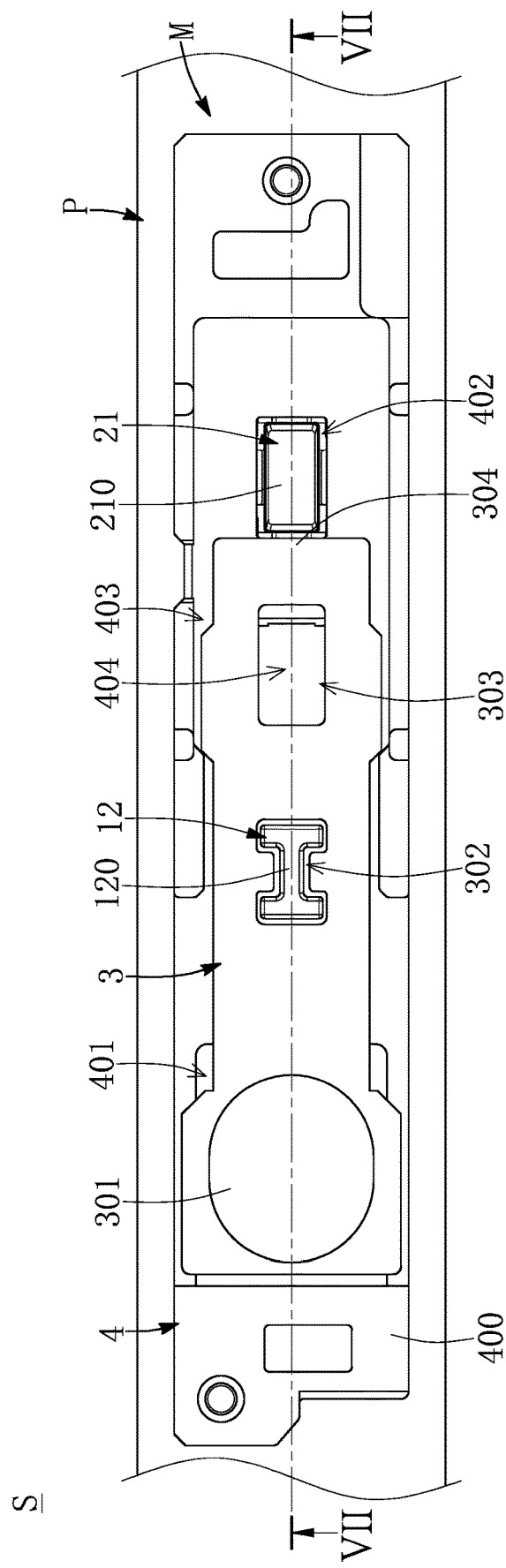
FIG. 6 is a schematic top view of a movable magnetic structure being moved relative to a fixed magnetic field generator from a first horizontal position to a second horizontal position according to the first embodiment of the present disclosure.
Figure 7:
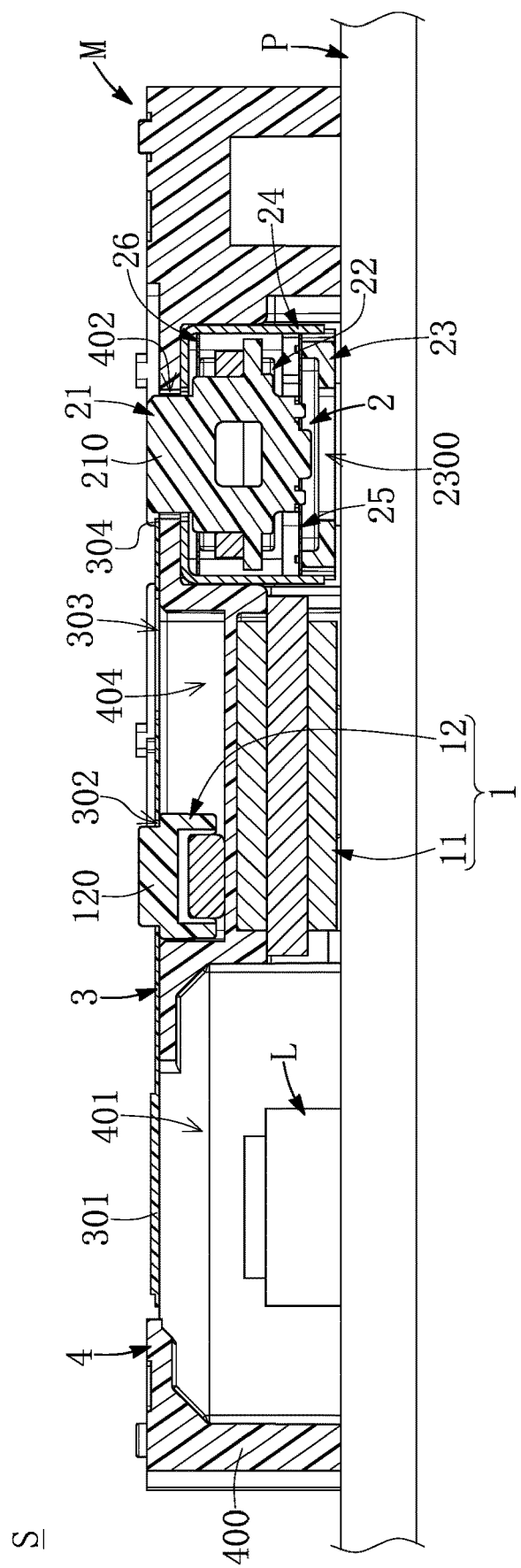
FIG. 7 is a partial cross-sectional view taken along line VII-VII of FIG. 6.
Figure 8:
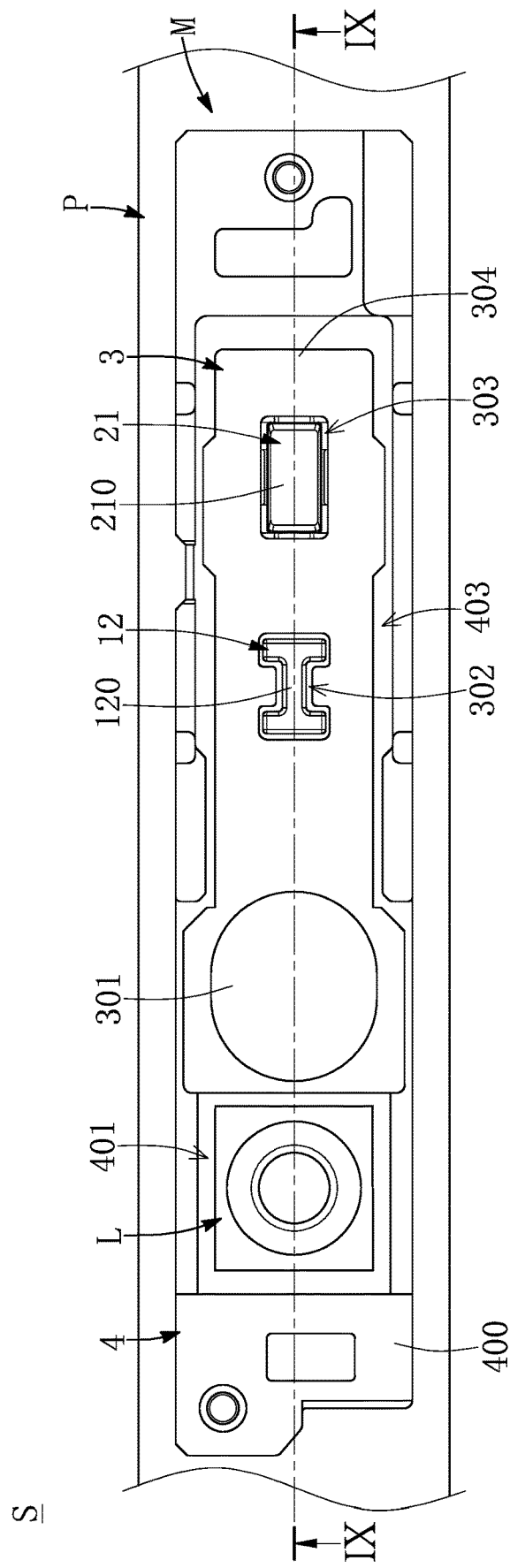
FIG. 8 is a schematic top view of the movable magnetic structure being moved relative to the fixed magnetic field generator from the second horizontal position to the first horizontal position according to the first embodiment of the present disclosure.
Figure 9:
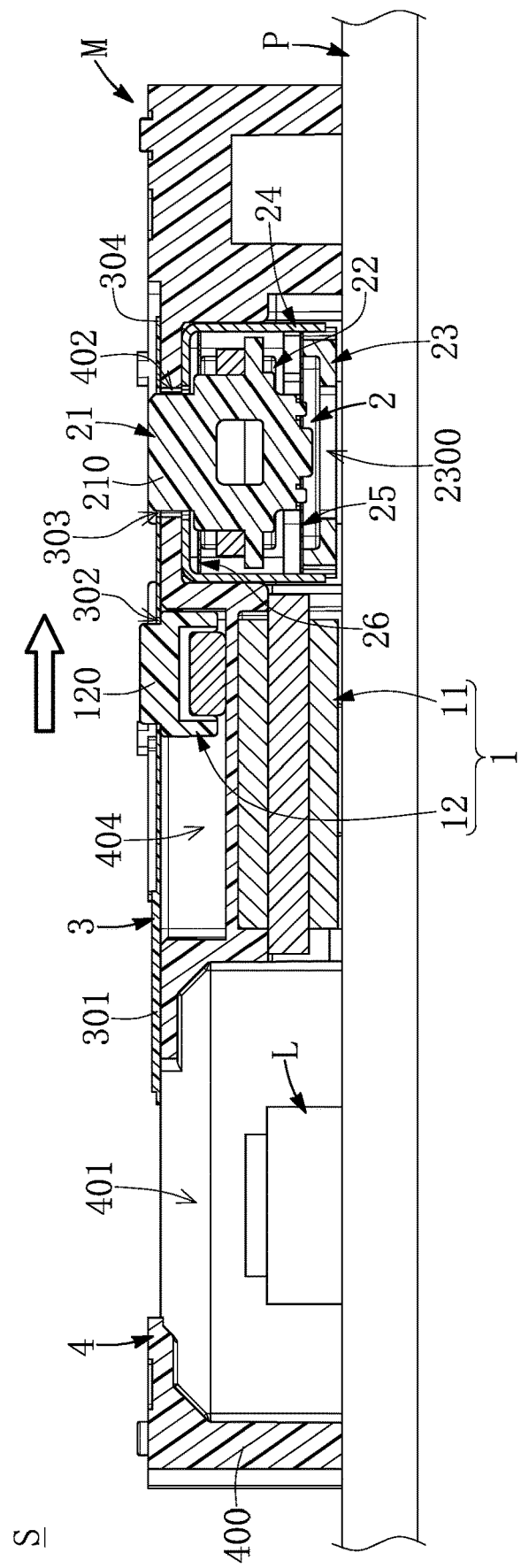
FIG. 9 is a partial cross-sectional view taken along line IX-IX of FIG. 8.
Figure 10:
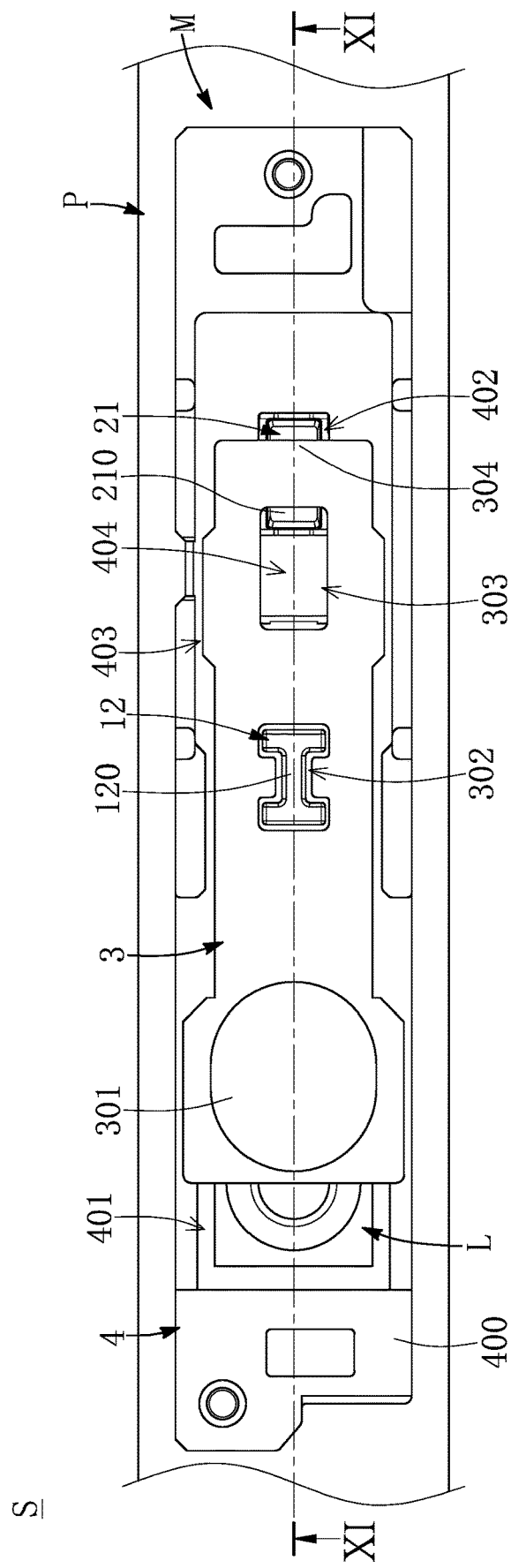
FIG. 10 is a schematic top view of the movable magnetic structure being movable between the first horizontal position and the second horizontal position relative to the fixed magnetic field generator according to the first embodiment of the present disclosure.
Figure 11:
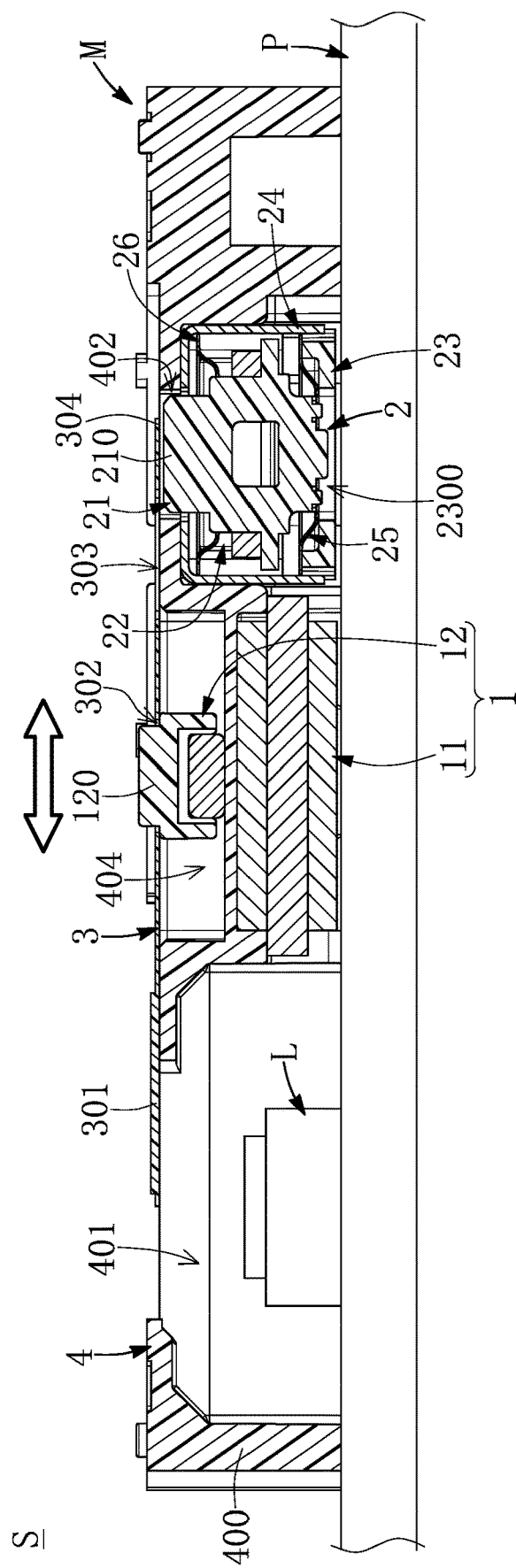
FIG. 11 is a partial cross-sectional view taken along line XI-XI of FIG. 10.

More particularly, referring to FIG. 6 to FIG. 11, when the fixed magnetic field generator 11 is turned on by a power source, the movable magnetic structure 12 is movable horizontally between a first horizontal position (as shown in FIG. 8 and FIG. 9) and a second horizontal position (as shown in FIG. 6 and FIG. 7) relative to the fixed magnetic field generator 11 by cooperation of the movable magnetic structure 12 and the fixed magnetic field generator 11. Furthermore, when the movable magnetic field generator 21 is turned on by a power source, the movable magnetic field generator 21 is movable vertically between a first vertical position (as shown in FIG. 6 to FIG. 9) and a second vertical position (as shown in FIG. 10 and FIG. 11) relative to the fixed magnetic structure 22 by cooperation of the fixed magnetic structure 22, the movable magnetic field generator 21 and the elastic structure (such as the first elastic element 25 and the second elastic element 26). However, the aforementioned description of the first embodiment is merely an example and is not meant to limit the scope of the present disclosure.

For example, referring to FIG. 6 and FIG. 7, when the movable magnetic structure 12 is horizontally moved relative to the fixed magnetic field generator 11 and from the first horizontal position (as shown in FIG. 8 and FIG. 9) to the second horizontal position (as shown in FIG. 6 and FIG. 7), the movable shutter assembly 3 is moved to a lens shielding position (as shown in FIG. 6 and FIG. 7) by the matching portion 120 of the movable magnetic structure 12 so as to shield the lens module L by the lens shutting portion 301, and the movable magnetic field generator 21 is placed at the first vertical position (as shown in FIG. 6 to FIG. 9) by an elastic force that is provided by the elastic structure (such as the first elastic element 25 and the second elastic element 26), so that a side portion 304 of the movable shutter assembly 3 is blocked by the limiting portion 210 of the movable magnetic field generator 21 so as to restrict the position of the movable shutter assembly 3 and prevent the movable shutter assembly 3 from being moved (to limit or restrict a movement of the movable shutter assembly 3). Therefore, when the lens shutting portion 301 of the movable shutter assembly 3 is moved so as to shield the lens module L, and the limiting portion 210 of the movable magnetic field generator 21 is moved to restrict the movable shutter assembly 3 so as to prevent the movable shutter assembly 3 from being moved, the lens module L is unable to capture image by cooperation of the lens shutting portion 301 of the movable shutter assembly 3 and the limiting portion 210 of the movable magnetic field generator 21. However, the aforementioned description of the first embodiment is merely an example and is not meant to limit the scope of the present disclosure.

For example, referring to FIG. 8 and FIG. 9, when the movable magnetic structure 12 is horizontally moved relative to the fixed magnetic field generator 11 from the second horizontal position (as shown in FIG. 6 and FIG. 7) to the first horizontal position (as shown in FIG. 8 and FIG. 9), the movable shutter assembly 3 can be moved to a lens opening position (as shown in FIG. 8 and FIG. 9) by the limiting portion 210 of the movable magnetic structure 12 so as to expose the lens module L from the lens shutting portion 301, and the movable magnetic field generator 21 can be placed at the first vertical position (as shown in FIG. 6 to FIG. 9) by the elastic force that is provided by the elastic structure (such as the first elastic element 25 and the second elastic element 26), so that the limiting portion 210 of the movable magnetic field generator 21 can be moved into the limiting opening 303 of the movable shutter assembly 3 so as to restrict the position of the movable shutter assembly 3 and prevent the movable shutter assembly 3 from being moved. Therefore, when the lens shutting portion 301 of the movable shutter assembly 3 is moved so as to expose the lens module L, and the limiting portion 210 of the movable magnetic field generator 21 is moved to restrict the movable shutter assembly 3 so as to prevent the movable shutter assembly 3 from being moved, the lens module L is able to capture image by cooperation of the lens shutting portion 301 of the movable shutter assembly 3 and the limiting portion 210 of the movable magnetic field generator 21. However, the aforementioned description of the first embodiment is merely an example and is not meant to limit the scope of the present disclosure.

For example, referring to FIG. 10 and FIG. 11, when the movable magnetic field generator 21 is vertically and downwardly moved relative to the fixed magnetic structure 22 from the first vertical position (as shown in FIG. 6 to FIG. 9) to the second vertical position (as shown in FIG. 10 and FIG. 11), the movable shutter assembly 3 can be released from the limiting portion 210 of the movable magnetic field generator 21, so that the movable shutter assembly 3 is movable between the first horizontal position (as shown in FIG. 8 and FIG. 9) and the second horizontal position (as shown in FIG. 6 and FIG. 7) relative to the fixed magnetic field generator 11. That is to say, when the movable magnetic field generator 21 is moved to the first vertical position (as shown in FIG. 6 to FIG. 9) relative to the fixed magnetic structure 22, the limiting portion 210 of the movable magnetic field generator 21 can be used to block the movable shutter assembly 3 so as to restrict the movable shutter assembly 3 at the first horizontal position for exposing the lens module L (as shown in FIG. 8 and FIG. 9) or the second horizontal position for shielding the lens module L (as shown in FIG. 6 and FIG. 7). However, the aforementioned description of the first embodiment is merely an example and is not meant to limit the scope of the present disclosure.

Second Embodiment

Figure 12:
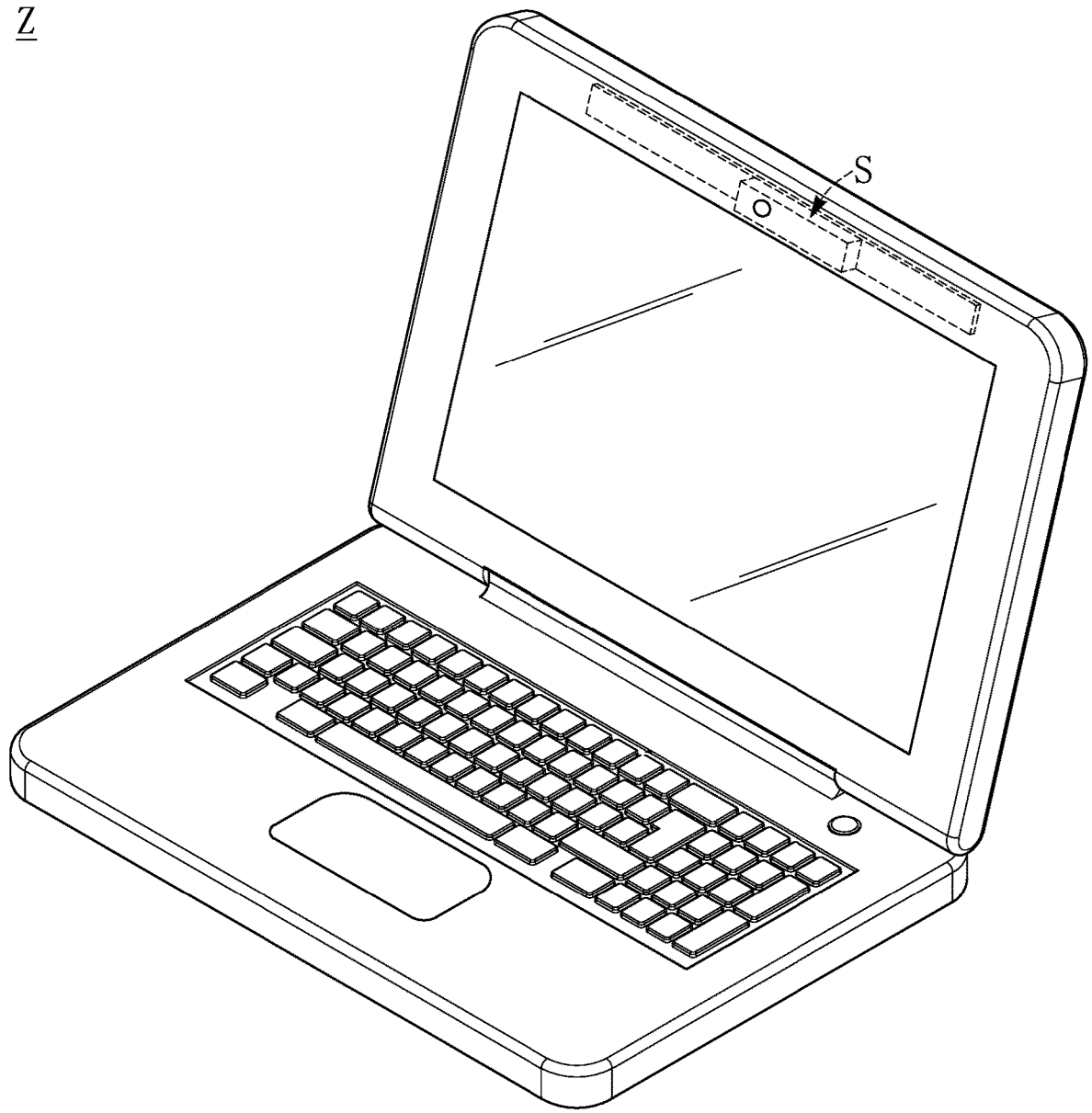
FIG. 12 is a schematic perspective view of a portable electronic device using the movable lens shutting module according to a second embodiment of the present disclosure.

Referring to FIG. 12, a second embodiment of the present disclosure provides a portable electronic device Z using an image-capturing assembly S (as shown in FIG. 6 to FIG. 11). More particularly, the image-capturing assembly S includes a lens module L disposed on a circuit substrate P and a movable lens shutting module M for cooperating with the lens module L (as shown in FIG. 1 to FIG. 5), and the movable lens shutting module M includes a first magnetic assembly 1, a second magnetic assembly 2, and a movable shutter assembly 3. For example, the portable electronic device Z may be a desktop, a laptop computer or a tablet computer. However, the aforementioned description of the second embodiment is merely an example and is not meant to limit the scope of the present disclosure.

Beneficial Effects of the Embodiments

In conclusion, by virtue of "the first magnetic assembly 1 including a fixed magnetic field generator 11 and a movable magnetic structure 12 adjacent to the fixed magnetic field generator 11, and the movable magnetic structure 12 including a matching portion 120", "the second magnetic assembly 2 including a movable magnetic field generator 21, a fixed magnetic structure 22 adjacent to the movable magnetic field generator 21, and an elastic structure connected to the movable magnetic field generator 21, and the movable magnetic field generator 21 including a limiting portion 210", and "the movable shutter assembly 3 including a lens shutting portion 301 corresponding to a lens module L, a matching opening 302 matching with the matching portion 120 of the movable magnetic structure 12, and a limiting opening 303 corresponding to the limiting portion 120 of the movable magnetic field generator 21", the movable magnetic structure 12 is movable horizontally between a first horizontal position and a second horizontal position relative to the fixed magnetic field generator 11, and the movable magnetic field generator 21 is movable vertically between a first vertical position and a second vertical position relative to the fixed magnetic structure 22.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A movable lens shutting module, comprising:
   a first magnetic assembly including a fixed magnetic field generator and a movable magnetic structure adjacent to the fixed magnetic field generator, wherein the movable magnetic structure includes a matching portion that protrudes outwards;
   a second magnetic assembly including a movable magnetic field generator, a fixed magnetic structure adjacent to the movable magnetic field generator, and an elastic structure connected to the movable magnetic field generator, wherein the movable magnetic field generator includes a limiting portion that protrudes outwards; and
   a movable shutter assembly including a lens shutting portion corresponding to a lens module, a matching opening matching with the matching portion of the movable magnetic structure, and a limiting opening corresponding to the limiting portion of the movable magnetic field generator;
   wherein the movable magnetic structure is movable horizontally between a first horizontal position and a second horizontal position relative to the fixed magnetic field generator by cooperation of the movable magnetic structure and the fixed magnetic field generator;
   wherein the movable magnetic field generator is movable vertically between a first vertical position and a second vertical position relative to the fixed magnetic structure by cooperation of the fixed magnetic structure, the movable magnetic field generator and the elastic structure;
   wherein, when the movable magnetic structure is horizontally moved relative to the fixed magnetic field generator from the first horizontal position to the second horizontal position, the movable magnetic field generator is placed at the first vertical position by an elastic force provided by the elastic structure, so that a side portion of the movable shutter assembly is blocked by the limiting portion of the movable magnetic field generator so as to limit a movement of the movable shutter assembly, and the movable shutter assembly is moved to a lens shielding position by the movable magnetic structure so as to shield the lens module by the lens shutting portion of the movable shutter assembly;
   wherein, when the movable magnetic structure is horizontally moved relative to the fixed magnetic field generator from the second horizontal position to the first horizontal position, the movable magnetic field generator is placed at the first vertical position by the elastic force provided by the elastic structure, so that the limiting portion of the movable magnetic field generator is moved into the limiting opening of the movable shutter assembly so as to prevent the movable shutter assembly from being moved, and the movable shutter assembly is moved to a lens opening position by the movable magnetic structure so as to expose the lens module from the lens shutting portion of the movable shutter assembly;
   wherein, when the movable magnetic field generator is vertically and downwardly moved relative to the fixed magnetic structure from the first vertical position to the second vertical position, the movable shutter assembly is released from the limiting portion of the movable magnetic field generator, so that the movable shutter assembly is movable between the first horizontal position and the second horizontal position relative to the fixed magnetic field generator.

2. The movable lens shutting module according to claim 1, further comprising:
   a carrying structure including a base body, a lens opening, a limiting portion opening, a first sliding groove, a second sliding groove, a first receiving groove and a second receiving groove;
   wherein the lens opening passes through the base body for exposing the lens module and corresponding corresponds to the lens shutting portion of the movable shutter assembly, and the limiting portion opening passes through the base body for exposing the limiting portion of the movable magnetic field generator and corresponds to the limiting opening of the movable shutter assembly;
   wherein the first sliding groove is formed on the base body for receiving the movable shutter assembly, and the movable shutter assembly is movably disposed inside the first sliding groove;
   wherein the second sliding groove is formed on the base body for receiving the movable magnetic structure and corresponds to the matching opening of the movable shutter assembly, and the movable magnetic structure is movably disposed inside the second sliding groove;
   wherein the first receiving groove is formed on the base body for receiving the fixed magnetic field generator, and the fixed magnetic field generator is fixedly disposed inside the first receiving groove;
   wherein the second receiving groove is formed on the base body for receiving the second magnetic assembly, and the second magnetic assembly includes a casing structure fixedly disposed inside the second receiving groove.

3. The movable lens shutting module according to claim 1, wherein the second magnetic assembly includes a casing structure, and the casing structure includes a bottom casing and a top casing matching with the bottom casing; wherein the elastic structure includes a first elastic element disposed on the bottom casing and a second elastic element disposed on the top casing, and the movable magnetic field generator is disposed between the first elastic element and the second elastic element; wherein the fixed magnetic structure includes a left fixed magnetic element disposed on a left inner wall of the top casing and a right fixed magnetic element disposed on a right inner wall of the top casing;

wherein the bottom casing has a bottom casing opening for exposing the first elastic element, and the top casing has a top casing opening for exposing the limiting portion of the movable magnetic field generator; wherein the first elastic element has a first left outer matching portion disposed on the bottom casing, a first right outer matching portion disposed on the bottom casing, a first left inner matching portion disposed on a first left matching portion of the movable magnetic field generator, a first right inner matching portion disposed on a first right matching portion of the movable magnetic field generator, a first left elastic portion connected between the first left outer matching portion and the first left inner matching portion, and a first right elastic portion connected between the first right outer matching portion and the first right inner matching portion; wherein the second elastic element has an outer surrounding matching portion disposed on the top casing, a second left inner matching portion disposed on a second left matching portion of the movable magnetic field generator, a second right inner matching portion disposed on a second right matching portion of the movable magnetic field generator, a second left elastic portion connected between the outer surrounding matching portion and the second left inner matching portion, and a second right elastic portion connected between the outer surrounding matching portion and the second right inner matching portion.

4. A movable lens shutting module, comprising:
a first magnetic assembly including a fixed magnetic field generator and a movable magnetic structure adjacent to the fixed magnetic field generator, wherein the movable magnetic structure includes a matching portion;
a second magnetic assembly including a movable magnetic field generator, a fixed magnetic structure adjacent to the movable magnetic field generator, and an elastic structure connected to the movable magnetic field generator, wherein the movable magnetic field generator includes a limiting portion; and
a movable shutter assembly including a lens shutting portion corresponding to a lens module, a matching opening matching with the matching portion of the movable magnetic structure, and a limiting opening corresponding to the limiting portion of the movable magnetic field generator.

5. The movable lens shutting module according to claim 4, further comprising:
a carrying structure including a base body, a lens opening, a limiting portion opening, a first sliding groove, a second sliding groove, a first receiving groove and a second receiving groove;
wherein the lens opening passes through the base body for exposing the lens module and corresponds to the lens shutting portion of the movable shutter assembly, and the limiting portion opening passes through the base body for exposing the limiting portion of the movable magnetic field generator and corresponds to the limiting opening of the movable shutter assembly;
wherein the first sliding groove is formed on the base body for receiving the movable shutter assembly, and the movable shutter assembly is movably disposed inside the first sliding groove;
wherein the second sliding groove is formed on the base body for receiving the movable magnetic structure and corresponds to the matching opening of the movable shutter assembly, and the movable magnetic structure is movably disposed inside the second sliding groove;
wherein the first receiving groove is formed on the base body for receiving the fixed magnetic field generator, and the fixed magnetic field generator is fixedly disposed inside the first receiving groove;
wherein the second receiving groove is formed on the base body for receiving the second magnetic assembly, and the second magnetic assembly includes a casing structure fixedly disposed inside the second receiving groove.

6. The movable lens shutting module according to claim 4, wherein the second magnetic assembly includes a casing structure, and the casing structure includes a bottom casing and a top casing matching with the bottom casing; wherein the elastic structure includes a first elastic element disposed on the bottom casing and a second elastic element disposed on the top casing, and the movable magnetic field generator is disposed between the first elastic element and the second elastic element; wherein the fixed magnetic structure includes a left fixed magnetic element disposed on a left inner wall of the top casing and a right fixed magnetic element disposed on a right inner wall of the top casing; wherein the bottom casing has a bottom casing opening for exposing the first elastic element, and the top casing has a top casing opening for exposing the limiting portion of the movable magnetic field generator; wherein the first elastic element has a first left outer matching portion disposed on the bottom casing, a first right outer matching portion disposed on the bottom casing, a first left inner matching portion disposed on a first left matching portion of the movable magnetic field generator, a first right inner matching portion disposed on a first right matching portion of the movable magnetic field generator, a first left elastic portion connected between the first left outer matching portion and the first left inner matching portion, and a first right elastic portion connected between the first right outer matching portion and the first right inner matching portion; wherein the second elastic element has an outer surrounding matching portion disposed on the top casing, a second left inner matching portion disposed on a second left matching portion of the movable magnetic field generator, a second right inner matching portion disposed on a second right matching portion of the movable magnetic field generator, a second left elastic portion connected between the outer surrounding matching portion and the second left inner matching portion, and a second right elastic portion connected between the outer surrounding matching portion and the second right inner matching portion.

7. A portable electronic device using an image-capturing assembly that includes a lens module and a movable lens shutting module cooperating with the lens module, and the movable lens shutting module comprising:
a first magnetic assembly including a fixed magnetic field generator and a movable magnetic structure adjacent to the fixed magnetic field generator, wherein the movable magnetic structure includes a matching portion;
a second magnetic assembly including a movable magnetic field generator, a fixed magnetic structure adjacent to the movable magnetic field generator, and an elastic structure connected to the movable magnetic field generator, wherein the movable magnetic field generator includes a limiting portion; and
a movable shutter assembly including a lens shutting portion corresponding to the lens module, a matching opening matching with the matching portion of the movable magnetic structure, and a limiting opening corresponding to the limiting portion of the movable magnetic field generator.

8. The portable electronic device according to claim 7, wherein the movable magnetic structure is movable horizontally between a first horizontal position and a second horizontal position relative to the fixed magnetic field generator by cooperation of the movable magnetic structure and the fixed magnetic field generator; wherein the movable magnetic field generator is movable vertically between a first vertical position and a second vertical position relative to the fixed magnetic structure by cooperation of the fixed magnetic structure, the movable magnetic field generator and the elastic structure; wherein, when the movable magnetic structure is horizontally moved relative to the fixed magnetic field generator from the first horizontal position to the second horizontal position, the movable magnetic field generator is placed at the first vertical position by an elastic force provided by the elastic structure, so that a side portion of the movable shutter assembly is blocked by the limiting portion of the movable magnetic field generator so as to prevent the movable shutter assembly from being moved, and the movable shutter assembly is moved to a lens shielding position by the movable magnetic structure so as to shield the lens module by the lens shutting portion of the movable shutter assembly; wherein, when the movable magnetic structure is horizontally moved relative to the fixed magnetic field generator from the second horizontal position to the first horizontal position, the movable magnetic field generator is placed at the first vertical position by the elastic force provided by the elastic structure, so that the limiting portion of the movable magnetic field generator is moved into the limiting opening of the movable shutter assembly so as to prevent the movable shutter assembly from being moved, and the movable shutter assembly is moved to a lens opening position by the movable magnetic structure so as to expose the lens module from the lens shutting portion of the movable shutter assembly; wherein, when the movable magnetic field generator is vertically and downwardly moved relative to the fixed magnetic structure from the first vertical position to the second vertical position, the movable shutter assembly is released from the limiting portion of the movable magnetic field generator, so that the movable shutter assembly is movable between the first horizontal position and the second horizontal position relative to the fixed magnetic field generator.

9. The portable electronic device according to claim 7, wherein the movable lens shutting module further comprises:

a carrying structure including a base body, a lens opening, a limiting portion opening, a first sliding groove, a second sliding groove, a first receiving groove and a second receiving groove;

wherein the lens opening passes through the base body for exposing the lens module and corresponds to the lens shutting portion of the movable shutter assembly, and the limiting portion opening passes through the base body for exposing the limiting portion of the movable magnetic field generator and corresponds to the limiting opening of the movable shutter assembly;

wherein the first sliding groove is formed on the base body for receiving the movable shutter assembly, and the movable shutter assembly is movably disposed inside the first sliding groove;

wherein the second sliding groove is formed on the base body for receiving the movable magnetic structure and corresponds to the matching opening of the movable shutter assembly, and the movable magnetic structure is movably disposed inside the second sliding groove;

wherein the first receiving groove is formed on the base body for receiving the fixed magnetic field generator, and the fixed magnetic field generator is fixedly disposed inside the first receiving groove;

wherein the second receiving groove is formed on the base body for receiving the second magnetic assembly, and the second magnetic assembly includes a casing structure fixedly disposed inside the second receiving groove.

10. The portable electronic device according to claim 7, wherein the second magnetic assembly includes a casing structure, and the casing structure includes a bottom casing and a top casing matching with the bottom casing; wherein the elastic structure includes a first elastic element disposed on the bottom casing and a second elastic element disposed on the top casing, and the movable magnetic field generator is disposed between the first elastic element and the second elastic element; wherein the fixed magnetic structure includes a left fixed magnetic element disposed on a left inner wall of the top casing and a right fixed magnetic element disposed on a right inner wall of the top casing; wherein the bottom casing has a bottom casing opening for exposing the first elastic element, and the top casing has a top casing opening for exposing the limiting portion of the movable magnetic field generator; wherein the first elastic element has a first left outer matching portion disposed on the bottom casing, a first right outer matching portion disposed on the bottom casing, a first left inner matching portion disposed on a first left matching portion of the movable magnetic field generator, a first right inner matching portion disposed on a first right matching portion of the movable magnetic field generator, a first left elastic portion connected between the first left outer matching portion and the first left inner matching portion, and a first right elastic portion connected between the first right outer matching portion and the first right inner matching portion; wherein the second elastic element has an outer surrounding matching portion disposed on the top casing, a second left inner matching portion disposed on a second left matching portion of the movable magnetic field generator, a second right inner matching portion disposed on a second right matching portion of the movable magnetic field generator, a second left elastic portion connected between the outer surrounding matching portion and the second left inner matching portion, and a second right elastic portion connected between the outer surrounding matching portion and the second right inner matching portion.

* * * * *